Oct. 25, 1949.  J. SCHECHTER  2,485,780
PIPE WASHING EQUIPMENT
Filed March 21, 1947
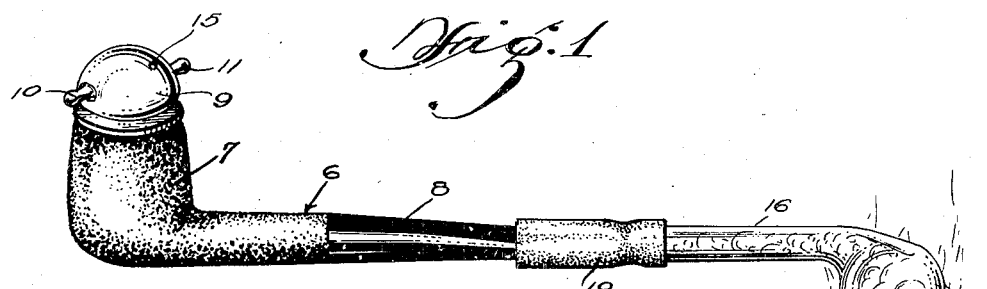
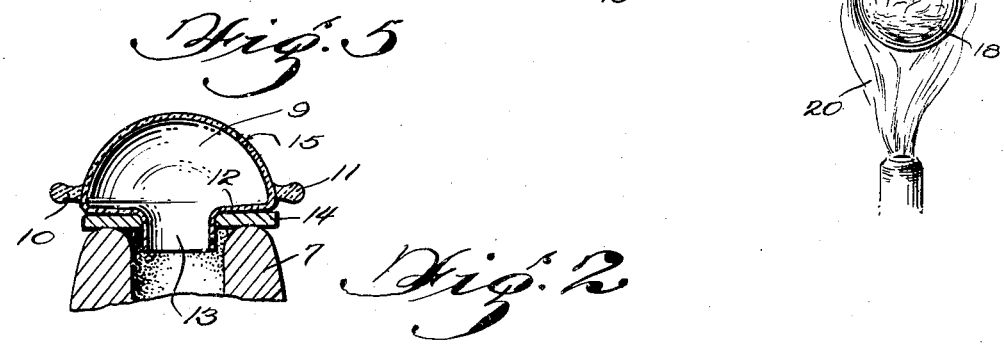
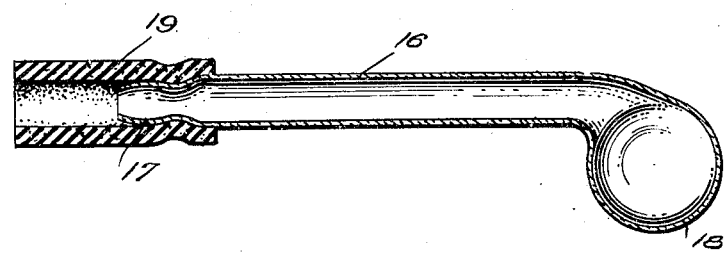
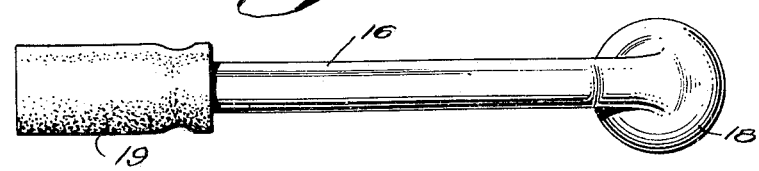
INVENTOR.
Julius Schechter
BY
Robert J. Dennison.
ATTORNEY Patented Oct. 25, 1949

2,485,780

UNITED STATES PATENT OFFICE 2,485,780

PIPE WASHING EQUIPMENT

Julius Schechter, Brooklyn, N. Y.

Application March 21, 1947, Serial No. 736,363

4 Claims. (Cl. 131—244)

This invention relates to equipment for washing tobacco pipes and treating the pipe simultaneously with an aromatic washing fluid comprising a mixture of maple syrup and rum or pure alcohol or whiskey.

It is an object of my invention to provide suitable equipment to wash or cleanse and treat a connected pipe bowl and its stem and includes a process for using the equipment.

It is an object of my invention to provide a method of cleansing a connected pipe bowl and its stem by the application of an aromatic fluid mixture through the application of heat to a portion of the equipment and thereby treat and cleanse the pipe by the ebullition of the mixture within the pipe and equipment.

It is an object of my invention to provide equipment comprising a cover for the pipe bowl and a tubular heat resisting container having a substantially spherical or bulbous closed end and a tubular open end suitably shaped for connection to one end of a flexible resilient tube whereby the container and its tube may be connected to the pipe stem.

Another object of the invention is to provide a pipe washing equipment that can be readily and easily assembled for use and/or disassembled for cleaning purposes.

A further object is to provide a pipe washing equipment of the above mentioned character that will be inexpensive and at all times positive and efficient in carrying out the purposes for which it has been designed.

Other objects and advantages will be revealed in the detailed description of my drawings which constitute a part of this application.

In the drawings:

Figure 1 is a perspective view of a tobacco pipe with my equipment applied thereto.

Figure 2 is a longitudinal sectional view of a portion of my equipment showing the container and tube having the tubular flexible resilient connection thereon.

Figure 3 is a plan view of the subject matter of Figure 2.

Figure 4 is an end elevational view of my container and its tubular portion.

Figure 5 is a vertical sectional view of my particular cover construction for the pipe bowl.

The drawing is merely illustrative and not definitive of my invention except as set forth in the subject matter claimed.

The reference characters identify the particular features and details of my invention as shown and described in my drawings and specification.

In the drawing the pipe 6 represents any conventional smoking pipe having a bowl 7 and a stem 8.

The equipment constituting my invention is applied in operative connection with the pipe 6. The equipment comprises a pipe bowl cover 9 made of any suitable heat resisting material and is preferably transparent. The cover constitutes a substantially hemispherical body having, at least, one pair of diametrical opposed finger knobs 10 and 11. The body 9 is also provided with a circular diaphragm 12 having a centrally located depending portion 13.

A gasket 14 is fitted about the portion 13 and engages both the diaphragm 12 and the upper edge of the pipe bowl 7. The gasket 14 is preferably yieldable and may be made of rubber or rubber composition or any other suitable material such as leather, etc. The cover 9 is provided with at least one vent opening 15 to provide for the escape of air and vapor while washing the pipe 6.

Another part of my equipment comprises a tubular element 16 having on one of its ends an open ended nipple 17 and on its opposite end a bulbous or substantially spherical portion 18 constituting a heating receptacle. The element 16 is made of heat resisting material and is preferably transparent. The connecting tube 19 is flexible, yieldable and resilient and provides a connecting means whereby the pipe stem 8 and the nipple 17 may be readily connected to provide a fluid tight communication between the element 16 and the pipe stem 8. The pipe stem should be wetted before applying the tube to it to prevent sticking.

The element 16 and the bulbous portion 18 are adapted to receive a cleansing medium such as rum 90% and 10% maple syrup by volume, or 90% pure alcohol and 10% maple syrup or 90% whiskey and 10% maple syrup or any other suitable aromatic mixture or solution.

The receptacle 18, when entirely filled with the liquid aromatic mixture may be heated in any suitable means such as a flame 20 produced by a Bunsen gas burner. Of course, any other suitable heating means may be used such as an alcohol lamp or burner, a lighted candle, etc.

When the heat is applied to the receptacle portion 18 and its contained aromatic liquid mixture, boiling or ebullition is produced together with some vaporization. The air is forced from the pipe and escapes through the vent opening at 15. Some of the mixture is propelled through the pipe stem 8 and into, at least, a major portion of the pipe bowl 7 and thereby cleanses or washes the pipe. When the application of heat is discontinued the assembly should be tilted so that the cleansing fluid can flow back into the element 16 and its bulbous portion 18. The dirty mixture is discarded when the unit 16, 17, 18 and 19 is disconnected from the pipe stem 8. This operation may be repeated as often as desired in order to produce a thorough cleansing or washing of the pipe.

From the above description and operation it can now be readily understood that I have not only provided a dual unit pipe washing or cleansing device but I have also provided a novel method of washing or cleansing a conventional tobacco pipe. Figuratively speaking, I have not only washed the pipe but in addition I have sweetened the pipe by my novel treatment thereof. Since the aromatic mixture used readily vaporizes the pipe will dry quickly and be ready for use in a few seconds. In order to accelerate the drying of the pipe, air may be blown through the pipe.

The whole device including the pipe and equipment may be designated a tobacco user's appliance.

During the washing operation the appliance should be suitably and successively tilted to facilitate the washing and treating process. Inasmuch as my appliance is light and portable, it may be readily moved into and out of the flame to suit conditions of treatment. When the appliance is moved out of the flame then the vapor of the washing fluid condenses and this condition tends to produce a condition of reduced pressure or partial vacuum which hastens the flow of washing fluid back to the receptacle 18 and the fluid carries with it nicotine and other undesirable material such as particles of tobacco, short cotton or paper lint and all other foreign substances that may have been present in the uncleaned pipe.

It will thus be seen from the foregoing description that I have provided a novel pipe washing equipment that can be readily and easily attached to a smoking pipe and removed therefrom. Further, my washing process will not affect or disturb the carbon deposit formed on the inside of the bowl of the smoking pipe. Due to its simplicity, my equipment can be manufactured at a very low cost.

While I have shown the preferred embodiment of my invention, it is to be understood that various changes in the size, shape and arrangement of parts may be resorted to without departing from the spirit of the invention and the scope of the appended claims.

Having thus described my invention, what I claim is:

1. The combination with a smoking pipe having a bowl and a stem and a mouthpiece and being formed with a continuous passage therethrough, a transparent substantially hemispherical hollow body formed with a vent opening and having a nipple of a diameter adapting it to fit within the tobacco-receiving end of the bowl, a gasket surrounding the nipple and positioned against the top of the pipe bowl to form a tight joint between said body and the bowl, knobs projecting outwardly from the body and adapted to be manipulated by the fingers of the operator to hold the body and the gasket in centered relation to the pipe bowl and apply compressing pressure to the gasket, a heating receptacle having a nipple adapted to be positioned in combination with the mouthpiece, and means for connecting the nipple of the heating receptacle with the mouthpiece whereby liquid heated in the receptacle will cause air in the pipe to escape through the vent opening and produce a percolating effect causing agitation of the liquid in the passage of the pipe and whereby the action of the liquid may be observed through the transparent hollow body.

2. The combination with a smoking pipe having a bowl, a stem and a mouthpiece and being formed with a continuous passage therethrough, a transparent hollow body formed in its upper portion with a vent opening and being provided at its bottom with a nipple of a diameter adapting it to fit into the tobacco-receiving end of the bowl, a gasket fitting about the nipple and bearing against the upper edge of the pipe bowl, said body having means permitting it to be manipulated by a person's fingers to detachably hold the body centered upon the bowl and to apply downward pressure upon the gasket to form a tight joint between the bowl and the body, a heating receptacle having a nipple aligned with the mouthpiece, and a coupling detachably connecting the nipple of the heater with the rear end of the mouthpiece and establishing communication between the heating receptacle and the passage of the pipe.

3. An apparatus for cleaning a smoking pipe by passage of a heated fluid back and forth through the bowl, stem and the mouthpiece of the pipe, comprising a hollow body of transparent material removably adapted to be applied to the upper end of a pipe bowl in communication therewith and having its upper portion formed with a vent opening, means for forming a tight joint between the bowl and the body, a heating receptacle having a nipple extending from its upper portion, and a coupling for detachably connecting the outer end of the nipple with the rear end of the mouthpiece of the pipe and forming a tight joint therewith.

4. An apparatus for cleaning a smoking pipe by passage of a heated fluid back and forth through the bowl, stem and the mouthpiece of the pipe, comprising a heating receptacle having a nipple extending laterally from its upper portion, means for detachably connecting the nipple with the rear end of the mouthpiece for effecting a flow of the heated liquid through the mouthpiece and the stem and upwardly through the bowl, and a hollow vented body adapted to be detachably applied to the upper end of the bowl and constituting a receptacle for catching the heated fluid and holding the same in position for return movement through the pipe by action of a partial vacuum formed in the receptacle during the cooling of the fluid.

JULIUS SCHECHTER.

REFERENCES CITED

The following references are of record in the file of this patent:

UNITED STATES PATENTS

| Number | Name | Date |
| --- | --- | --- |
| 188,627 | Havell | Mar. 20, 1877 |
| 1,213,215 | Kuprel | Jan. 23, 1917 |

FOREIGN PATENTS

| Number | Country | Date |
| --- | --- | --- |
| 15,394 | Great Britain | 1897 |
| 138,522 | Great Britain | Feb. 12, 1920 |
| 189,988 | Great Britain | Dec. 14, 1922 |